G. O. DEGENER.
COMBINED TYPE WRITING AND COMPUTING MACHINE.
APPLICATION FILED JULY 3, 1912.
1,260,281.
Patented Mar. 19, 1918.
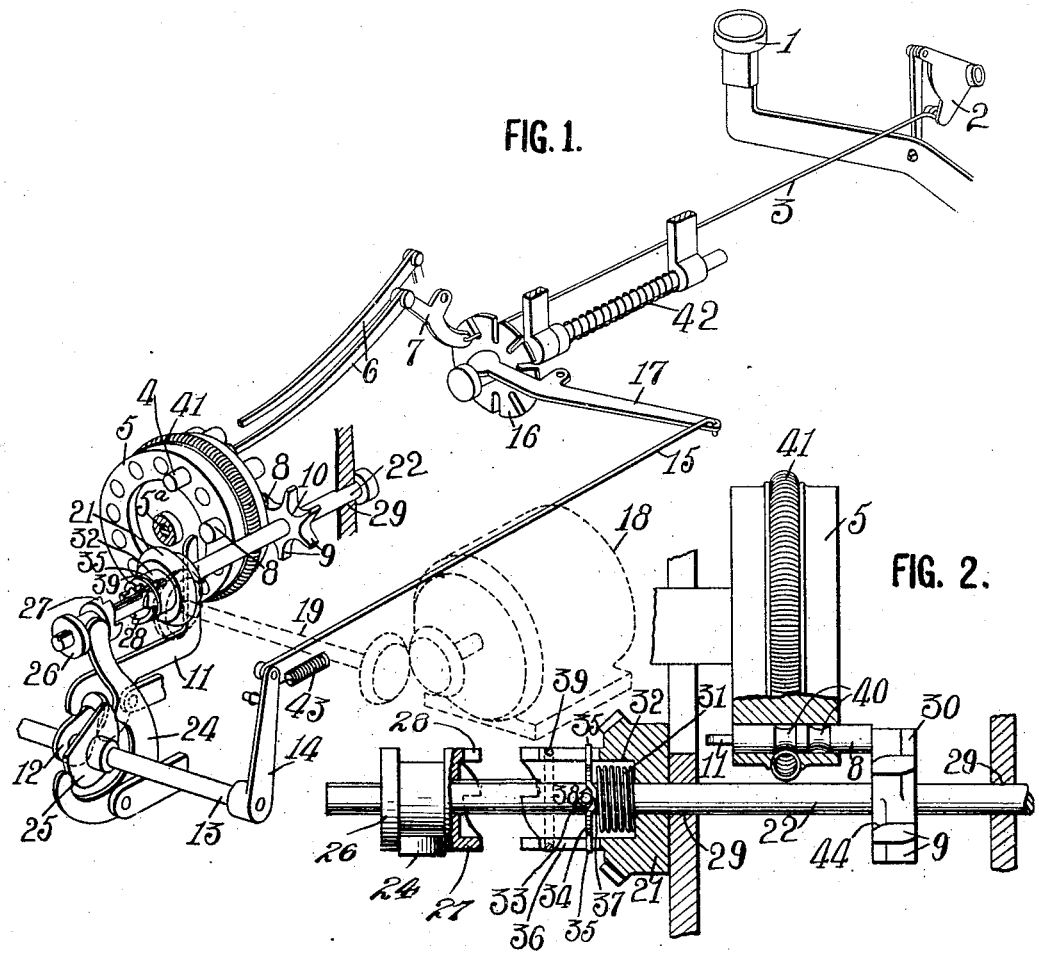
FIG. 1.
FIG. 2.
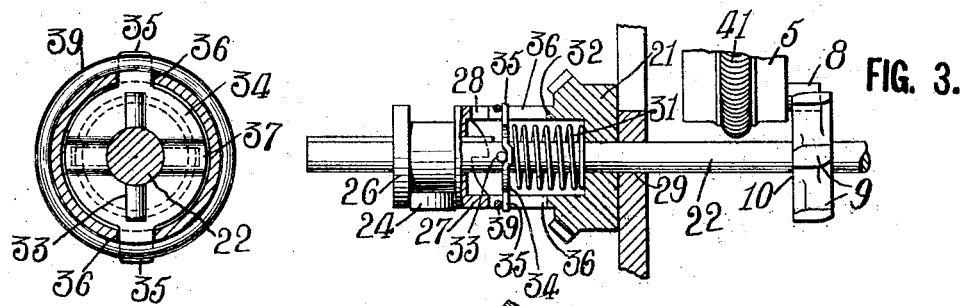
FIG. 4.    FIG. 3.
WITNESSES:
J. A. Brophy
Titus H. Irons
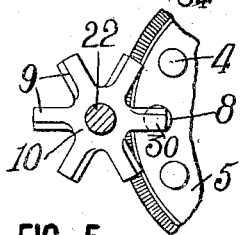
FIG. 5.
INVENTOR:
BY Gustave O. Degener
A. B. Stickney
ATTORNEY

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,260,281.     Specification of Letters Patent.     Patented Mar. 19, 1918.

Application filed July 3, 1912. Serial No. 707,565.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to computing machines, and is herein disclosed as an improvement on my Patent No. 1,020,082, dated March 12, 1912.

In said patent is disclosed a combined typewriting and computing machine in which the numeral keys of the typewriter carry into the computing mechanism, by means of a motor, the numbers that are written. This they accomplish by displacing teeth or pins on an index wheel which is adapted to be driven by said motor to an extent determined by said numeral keys. Said index or pin wheel normally stands idle with one of its pins displaced, so that a power-driven wheel may rotate idly in the space which would be occupied by said pin in its normal position.

On the depression of a numeral key the displaced pin is restored to position where it engages the teeth of said power-driven wheel, and another pin on said index wheel is displaced so that said power-driven wheel will rotate the index wheel until the vacant space which the pin last displaced occupied comes opposite said power-driven wheel.

Said power-driven wheel, during part of the operation of a numeral key, is disconnected from the power, but the complete operation of a numeral key throws in a clutch which connects said power-driven wheel to the motor. While said power-driven wheel is disconnected from its power, the pin is restored to its place to mesh with said wheel. In said patent means are provided for allowing said power-driven wheel to be moved for a moment out of the path of the pin which is being replaced, so that even if one of its teeth lies in the path of the pin, said power-driven wheel will not prevent the replacing of the pin.

In the present invention the motor is preferably utilized to rotate the power-driven wheel to carry its tooth out of the path of the pin which is being replaced; and this is preferably accomplished by providing an auxiliary clutch which connects the motor to said power-driven wheel whenever said power-driven wheel may be struck by the pin which is being replaced. This clutch may be of the friction type, and includes one member fast to said power-driven wheel. A spring, preferably formed as a part of said clutch, bears against the other member of said clutch, and so tends to hold the power-driven wheel against being moved by any pin being replaced. From this construction it results that whenever the power-driven wheel is struck by a pin, this clutch tends to seize and rotate its wheel so that the teeth of said wheel are out of the path of the pin which is being replaced.

Other features and advantages will hereinafter appear.

In the accompanying drawings,

Figure 1 represents a perspective view of some parts of a combined typewriting and computing machine of the general type disclosed in the aforesaid patent.

Fig. 2 is a front view of the auxiliary clutch and some allied parts when the power driven wheel is displaced by a pin.

Fig. 3 is a view similar to Fig. 2 showing the parts in normal position.

Fig. 4 shows some details of the clutch.

Fig. 5 shows the relation of the power-driven wheel and the index wheel when a pin is being replaced and said power-driven wheel stands in the path of the pin.

Each numeral key 1 when depressed swings its bell crank 2 to draw its link 3 to the left, as viewed in Fig. 1, and when partly depressed, as shown in said figure, projects a pin 4 on a pin or valuating or index wheel 5, by means of a jack 6 pivoted to a lever 7, which is operated by said link 3. At about the same time or a little later, a pin 8 which had been previously displaced on said index wheel, is restored to position by the operation of said key so that it lies in the path of the teeth 9 on a power-driven spur wheel 10; and thus if said power-driven wheel is connected to the power, the index or counting wheel 5 will be turned by its pins until the displaced pin 4 comes opposite said power-driven wheel, and then the index wheel will stop, because there is no pin by which the index wheel may be turned farther.

Said pin 8 is restored by the numeral key as above mentioned, by means of a cam-operated lever 11 operated through a cam 12 fast on rock shaft 13, which rock shaft is rocked through an arm 14 fast on it and joined through a link 15 to a lever 17, which lever is operated by a universal member 16; said universal member operated by the ends of the pin-setting levers 7.

Said power-driven wheel 10 is diagrammatically shown as normally connected to a motor 18 through shaft 19 by means of a gear wheel 21 loose on the shaft 22 of the power-driven wheel 10 to which shaft the gear wheel 21 may be locked by means of a clutch 23. Said clutch, as above mentioned, is normally closed, but with the operation of a numeral key 1, is opened by means of a lever 24 operated by a cam 25 fast on aforesaid rock shaft 13. Said clutch comprises a member 26 slidably splined on said shaft 22 and carrying teeth 27 arranged to mesh with teeth 28 on the hub of the motor-driven gear wheel 21. In this way when the two parts of the clutch are brought together by lever 24 at the operation of a numeral key, the shaft is positively locked to turn with the gear wheel 21.

The shaft 22 of the power-driven wheel 10 is slidably mounted in its bearings 29 so that it may be pushed along if the pin 8 happens to strike a tooth 30 on said wheel, as seen in Fig. 5, when the pin is replaced to engage with said wheel 10. This allows said pin to be replaced. In so sliding, the shaft 22 compresses a spring 31 in the hub 32 of the gear wheel 21 and causes a pin 33 fast in the shaft 22 to bear against a plate 34 loose on said shaft. Said plate comprises extensions 35 projecting through longitudinal slots 36 in said hub 32, and thus said plate always must revolve with said gear wheel 21. If the pin 8 on the index wheel 5 happens to strike against a tooth 30, the pin 33 is carried by the shaft 22 so that it bears more strongly against the plate 34 and tends to be carried around by said plate. Said plate 34 is arranged to carry said pin 33 around with more torque than ordinary friction will give it, because the pin 33 normally lies in a valley 37 in it, in which valley the pin tends to be held by the expansion of spring 31. Said valley is arranged on a diameter in said plate so that the pin 33 will lie easily in it, and the sides 38 of said valley are beveled off so that under considerable torque, the pin will ride out of said valley and tend to revolve only by the friction of the pin on the surface of the plate. Thus when wheel 10 is moved out by the pin 8 during the operation of displacing it, the clutch formed by the pin 33 and the valley 37 fails to seize positively to rotate the wheel 10, but nevertheless has considerable tendency to rotate it. The teeth 9 of the power-driven wheel 10 are beveled as seen at 44 so that the slight rotation of wheel 10 will carry the flat ends of said teeth 9 out of the path of pin 8, and this will occur so rapidly that the striking of the pin against a tooth 9 will not affect the touch of the key.

The ends of the slots 36, in which the extensions 35 of the plate 34 lie, may be closed by a ring 39 snapped into a hollow on the extension of the hub 32.

The pins in the index wheel 5 may comprise two hollows 40 into one of which a coil spring 41 surrounding said wheel will snap in whichever position said pins are located for the time being, and thus hold them against accidental displacement. The index wheel 5 is fast on a shaft 5ª through which the computing or register wheels, not shown, are driven.

The universal clutch-operating member 16 is held in its normal position by means of a spring 42, and a spring 43 drawing on the rock arm 14 normally to hold clutch 26 closed.

Variations may be resorted to within the scope of the invention, and portions of the improvements may be used without others.

Having thus described my invention, I claim:

1. In a computing machine, the combination with a numeral key, and a power-driven shaft, of a wheel comprising a series of spaced pins, a computing shaft driven by said wheel, a second wheel arranged to drive said pin wheel by said pins, key-operated means for shifting a pin into the path of said second wheel and concomitantly withdrawing another pin from the path of said second wheel, a shaft on which said second wheel is fixed, said shaft slidable if struck by a pin, and a clutch for connecting said power-driven shaft to said slidable shaft as it slides.

2. In a computing machine, the combination with a numeral key, and a power-driven shaft, of a wheel comprising a series of spaced pins, a computing shaft driven by said wheel, a second wheel arranged to drive said pin wheel by said pins, key-operated means for shifting a pin into the path of said second wheel and concomitantly withdrawing another pin from the path of said second wheel, a shaft on which said second wheel is fixed, said shaft slidable if struck by a pin, a spring returning said slidable shaft, and a clutch gradually seizing as said shaft is so slid.

3. In a computing machine, the combination with a numeral key, and a power-driven shaft released from its power at the operation of said numeral key, of a wheel comprising a series of spaced pins, a computing shaft driven by said wheel, a second wheel arranged to drive said pin wheel by said pins, key-operated means for shifting a pin into the path of said second wheel and concomitantly withdrawing another pin from the path of said second wheel, a shaft on which said second wheel is fixed, said shaft slidable if struck by a pin, a clutch to connect said last-mentioned shaft to its power, means for operating said clutch after said key has made a considerable movement, and a clutch arranged to seize gradually as said slidable shaft slides when struck by a pin.

4. In a computing machine, the combination with a numeral key, of an index wheel comprising a series of spaced pins, a second wheel arranged to drive said pin wheel by said pins, a source of power, means controlled by said numeral key for enabling said source of power to drive said second-mentioned wheel, key-operated means for shifting a pin into the path of said second wheel and concomitantly withdrawing a pin from the path of said second wheel, and means controlled by said source of power for slightly turning said second wheel if said wheel is in a position to be struck by a pin.

5. In a computing machine, the combination with a numeral key, of an index wheel comprising a series of spaced pins, a second wheel arranged to drive said pin wheel by said pins, a source of power, means controlled by said numeral key for enabling said source of power to drive said second-mentioned wheel, key-operated means for shifting a pin into the path of said second wheel and concomitantly withdrawing a pin from the path of said second wheel, a shaft on which said second wheel is fixed, said shaft slidable if struck by a pin, and means under control of said source of power for slightly turning said shaft and wheel when so slid.

6. In a computing machine, the combination with an index wheel having a series of spaced pins, of a second wheel arranged to drive said index wheel by said pins, a source of power for said second wheel, key-operated means for shifting a pin into the path of said second wheel and concomitantly withdrawing another pin from the path of said second wheel, a shaft on which said second wheel is fixed, means for driving said second wheel from said source of power including a wheel having a hub and a toothed clutch forming part of said hub, and means also controlled from said source of power for slightly turning said second wheel if struck by a pin, said last-mentioned means including a friction plate slidable in said hub, a spring between said plate and an integral face of said hub, and a pin on said shaft arranged to form a clutch by bearing against said plate.

7. In a computing machine, the combination with an index wheel having a series of spaced pins, of a second wheel arranged to drive said index wheel by said pins, a source of power for said second wheel, key-operated means for shifting a pin into the path of said second wheel and concomitantly withdrawing another pin from the path of said second wheel, a shaft on which said second wheel is fixed, means for driving said second wheel from said source of power including a wheel having a hub and a main clutch forming part of said hub, and means also controlled from said source of power for slightly turning said second wheel if struck by a pin, said last-mentioned means including a friction plate slidable in and revolving with said hub, a spring between said plate and an integral face of said hub, a pin on said shaft, and a hollow comprising sloping sides in said plate, in which hollow said pin is arranged to tend to lie to be driven by said plate.

8. In a computing machine, the combination with a computing shaft and numeral keys, of a toothed wheel revoluble with said shaft and forming part of an indexing mechanism, means whereby said toothed wheel is selectively controlled by said keys, to effect such indexing, a second toothed wheel with which said first-named toothed wheel is intended to mesh at a key operation to carry said indexing into the computing shaft, a slidable shaft on which said second toothed wheel is fast, so that said slidable shaft may slide with its toothed wheel if the toothed wheels fail to mesh at the key operation, and a power-driven clutch for causing said second toothed wheel to be turned to meshing position if it so slides.

9. In a computing machine, the combination with a computing shaft and numeral keys, of a toothed wheel revoluble with said shaft and forming part of an indexing mechanism, a source of power for driving said indexing mechanism, means whereby said toothed wheel is selectively controlled by said keys to effect such indexing, means whereby said indexing mechanism is disconnected from said source of power during the initial operation of a numeral key but later connected thereto, a second toothed wheel with which said first-named toothed wheel is intended to mesh at a key operation to carry said indexing into the computing shaft, a slidable shaft on which said second toothed wheel is fast, so that said slidable shaft may slide with its toothed wheel if the toothed wheels fail to mesh at the key operation and a power-driven clutch driven by said source of power for causing said second toothed wheel to be turned to meshing position if it so slides.

10. The combination with a numeral key and a power-driven computing shaft, of a wheel comprising a series of spaced pins, a second wheel arranged to drive said pin wheel by said pins, key-operated means for shifting a pin into the path of said second wheel, a shaft on which said second wheel is fixed, said last-mentioned shaft slidable if struck by a pin, and a clutch connecting said power-driven computing shaft to said slidable shaft as it slides.

11. The combination with a numeral key and a power-driven computing shaft, of a wheel comprising a series of spaced pins, a second wheel arranged to drive said pin wheel by said pins, key-operated means for shifting a pin into the path of said second wheel, a shaft on which said second wheel is fixed, said last-mentioned shaft slidable if struck by a pin, a spring returning said slidable shaft, and a clutch gradually seizing as said last-mentioned shaft is slid.

12. The combination with a numeral key and a power-driven computing shaft released from its power at the operation of the key, of a wheel comprising a series of spaced pins, a second wheel arranged to drive said pin wheel by said pins, key-operated means for shifting a pin into the path of said second wheel, a shaft on which said second wheel is fixed, said last-mentioned shaft slidable if struck by a pin, a clutch to connect said last-mentioned shaft to its power, means for operating said clutch after said key has made considerable movement, and a clutch arranged to seize gradually as said slidable shaft slides when struck by a pin.

13. The combination with a shaft, of a member revolving with said shaft and shiftable on it, a toothed wheel with which said shiftable member is intended to mesh, a shiftable shaft to which said toothed wheel is fast so that said shiftable shaft may shift with its toothed wheel if said shiftable member fails to mesh and strikes a tooth, and a clutch for causing said toothed wheel to be turned if it is so shifted.

14. The combination with a shaft, of a member revolving with said shaft and shiftable on it, a source of power, a toothed wheel disconnected from said source of power during the initial operation of a numeral key but later connected thereto, said toothed wheel being intended to mesh with said shiftable member, a shiftable shaft on which said toothed wheel is fast so that said shiftable shaft may shift with its toothed wheel if said shiftable member fails to mesh and strikes a tooth of said toothed wheel and a clutch for causing said toothed wheel to be turned if it is so shifted.

15. In a computing machine, the combination with a numeral key and a motor adapted to be rotating when said key is depressed, of an indexing device comprising teeth settable by said key, a gear wheel whereby said motor may drive said indexing device by its teeth, and means whereby said motor is connected at the operation of said key to cause relative motion between said indexing device and said gear wheel to move them to meshing position.

16. In a computing machine, the combination of a computation wheel having a circle of pins or projections whereby it may be driven, each of said pins being displaceable independently of the others, a power-driven pinion to mesh with said pins to drive said computation wheel, selective means for displacing said pins thereby to disconnect said wheel from said pinion at the required point, and power-driven means for turning said pinion to cause it to mesh with said pins.

17. In a computing machine, the combination with a computation gear capable of being mutilated, of a pinion to mesh with said gear, a set of keys, means to enable the keys to variably mutilate said gears thereby to disconnect the pins from the same at a point determined by the key operated, a power-rotated member, a clutch controlled by said keys between said power-rotated member and said pinion, and means for momentarily connecting said pinion to said power-rotated member to cause said pinion to mesh with said gear.

18. In a computing machine, the combination with a computation gear capable of being mutilated, of a pinion to mesh with said gear, a set of keys, means to enable the keys to variably mutilate said gear for disconnecting the pinion from the same at a point predetermined by the key operated, a power-rotated member, a clutch between said power-rotated member and said pinion, means for enabling any of said keys to restore the gear at the point where it was previously mutilated, thereby to re-connect said gear to said pinion, and a connection between said pinion and said power-rotated member adapted to rotate said pinion to meshing position on the depression of a key.

19. In a computing machine, the combination with a mutilatable pin wheel, of a pinion drive for said wheel being normally in register with a mutilated portion of said wheel, a driving train for said pinion having a normally closed clutch, means for concomitantly completing said mutilated wheel to enable a drive by said pinion and open said clutch to prevent a drive by said pinion, and an auxiliary clutch in said driving train enabling a slight drive of said pinion to justify the relation thereof with respect to said pin wheel at its newly completed point.

GUSTAVE O. DEGENER.

Witnesses:
J. E. LUCAS,
J. E. DAVIDSON.